Nov. 10, 1970     O. RISGIN     3,539,811
STANDARD OR REFERENCE SOURCE OF INFRARED RADIATION
Filed Aug. 15, 1968
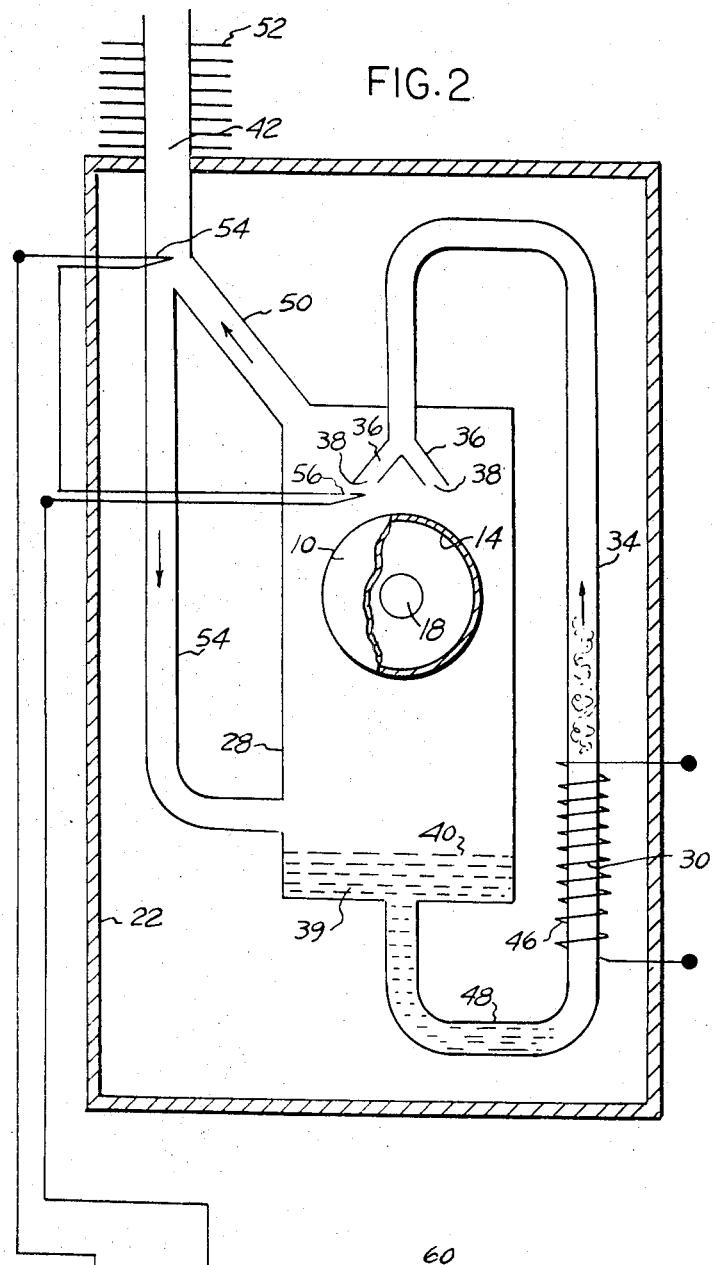
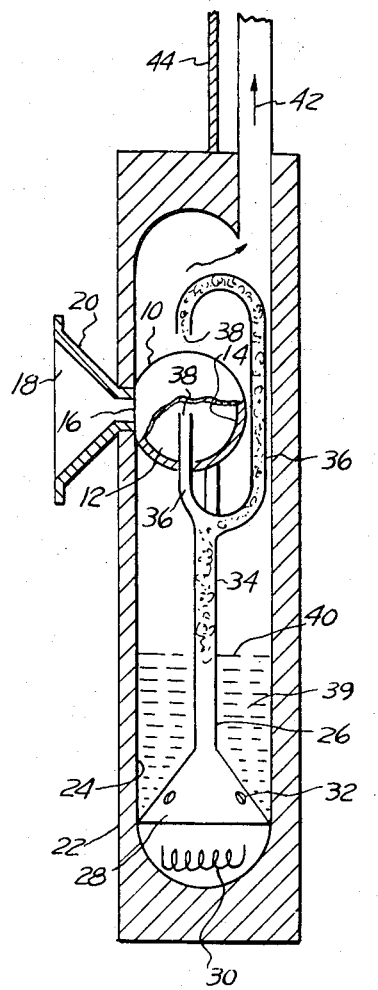
INVENTOR
OJARS RISGIN
BY Hauke, Krass, Gifford, & Patalidis
ATTORNEYS

United States Patent Office 3,539,811
Patented Nov. 10, 1970

3,539,811
STANDARD OR REFERENCE SOURCE OF INFRARED RADIATION

Ojars Risgin, Ann Arbor, Mich., assignor to Chain Lakes Research Associates, Inc., Detroit, Mich., a corporation of Michigan
Filed Aug. 15, 1968, Ser. No. 752,880
Int. Cl. H01j 35/00
U.S. Cl. 250—85                                    6 Claims

ABSTRACT OF THE DISCLOSURE

A standard or reference source of infrared radiation consisting of a hollow black body whose cavity is provided with a viewing aperture and maintained at a substantially constant temperature by spraying of the outer surface of the black body with a mixture of boiling liquid and vapors of a chemically pure fluid.

BACKGROUND OF THE INVENTION

The present invention belongs to the field of standard or reference sources of infrared radiation useful as a calibration source for radiometric instruments, pyrometers, and the like.

Prior art standard or reference sources of infrared radiation are known which consist of a hollow black body, generally conically shaped or shaped as a pair of opposed cones connected at their bases, the black body having an electrical heating element wound around the periphery of the body. When the body is heated by way of the heating element, its interior surface emits infrared radiation whose intensity and spectral distribution is determined only by the temperature through Planck's radiation law. In order to be useful as a standard or reference source, the temperature of the black body must be maintained constant and uniform over the interior surface. Present black body sources require complicated thermal controls to regulate the temperature of the black body radiating surface to ±.5° C. at best, with a temperature accuracy of ±1° C.

SUMMARY OF THE INVENTION

The standard of reference source of infrared radiation of the present invention, by spraying a mixture of boiling liquid and vapor over the surface of the black body, and by utilizing a pure liquid fluid having a well defined boiling temperature, permits to obtain a precise temperature for the black body radiating surface which is accurate within ±.001° C.

The many objects and advantages of the present invention will become apparent to those skilled in the art when the following description of an example of the best modes contemplated to carry out the invention is read in conjunction with the accompanying drawing wherein like refrence numerals refer to like elements and in which:

BRIEF DESCRIPTION OF THE DRAWING

FIG. 1 is a schematic representation, partly in section, of a standard or reference source of infrared radiation according to the present invention; and FIG. 2 is a schematic representation of a modification of the arrangement of FIG. 1.

DESCRIPTION OF THE PREFERRED EMBODIMENT

As shown in FIG. 1, an example of a standard or reference source of infrared radiation according to the present invention comprises a hollow black body 10, defining the source of infrared radiation when heated at a predetermined temperature, the black body being preferably in the form of a hollow sphere having a substantially thin wall 12 made of thermally conductive metal such as, for example, copper, and coated on the inside surface 14 with an appropriate adhering black coating. Although a spherical shape for the black body 10 provides best and most uniform emissivity, it is obvious that more conventional shapes, such as conical shapes or accordion shapes may be used if so preferred.

The black body 10 is provided with a viewing aperture 16 preferably having a shield 18, preferably conical and made of a polished highly reflective material such as polished stainless steel, gold-plated metal or the like, and having an aperture 20 at the apex of the conical shield registering or common with the aperture 16 of the cavity. The conical shield 18 thus defines a solid angle of projection of the infrared radiation emitted by the inner surface 14 of the black body cavity when hot, up to $2\pi$ steradians. Alternately the viewing aperture 16 may be partially masked by a flat screen (not shown) having a plurality of apertures of different diameters, thus providing a source with different emissive areas.

The black body 10 is disposed within an enclosure 22 with the conical shield 18 disposed on the outside of the enclosure. The enclosure 22 is constructed of non-emissive materials, and may be made in any convenient manner, that is with solid heat insulating walls, or with outer and inner thin walls with the space therebetween filled with a heat insulating material. Preferably, the inner surface 24 of the enclosure 22 is coated with a highly reflective coating, such as silver, polished aluminum, or the like, so as to prevent as much as possible heat transfer from the interior of the enclosure 22 to the exterior thereof, and the outer surface is also preferably polished to reduce emission from the surface.

Within the enclosure 22 there is disposed a percolator, shown generally at 26, including a reservoir 28 mounted on the bottom of the interior of the enclosure and having a heating coil 30 disposed therein connected across a source of electric power, not shown. The reservoir 28 is provided with a plurality of holes 32 and has fitted on its top an outlet conduit 34 having one or several branches, as shown at 36, with outlet orifices 38 disposed proximate the outer surface of the black body 10. The percolator 26 is made of any convenient material such as stainless steel or glass, and when the interior of the enclosure 22 is filled with a liquid fluid 39 to an appropriate level, for example, as shown at 40, the liquid fluid 39 entering the boiler 28 through holes 32 is heated by heater coil 30 to its boiling temperature. The boiling fluid rises through conduit 34 and is sprayed, through outlet orifices 38, over the outer surface of the black body 10 such that the outer surface of the black body is continuously in contact with a mixture of boiling liquid and vapors of the fluid. The top of the enclosure 22 has a condenser 42 which may be a straight conduit, as shown, or may include a cooling coil disposed on the outside of the enclosure for cooling and condensing the escaping vapors of the fluid and returning the condensed vapors to the interior of the enclosure 22. The condenser 42 is preferably shielded by means of a highly reflecting non-emissive shield 44, such that the surface of the condenser conduit, which is at a relatively high temperature, is prevented from emitting infrared radiation that could cause inaccuracy in readings of the source temperature.

Any chemically stable pure liquid fluid may be used in the invention, such that the black body having its exterior constantly sprayed with a mixture of the boiling liquid and vapors of the fluid is maintained at a well defined substantially constant temperature corresponding to the boiling temperature of the fluid. For example, using quinoline for the liquid fluid 39 within the enclosure 22, the infrared source of the invention operates at a well defined temperature of 510° K. at a normal barometric pressure of 29.92 in. Hg.

As previously mentioned, the temperature of the black body 10 is automatically maintained at the boiling point of the liquid fluid with a precision of ±.001° C. the only correction required being a slight correction due to the deviation of the actual barometric pressure from standard pressure. Because the outer surface of the black body 10 is constantly sprayed with the mixture of boiling liquid and vapor, there is no cooling effect due to returning condensed vapor, and by utilizing a mixture of liquid and vapor there is no error introduced resulting from superheating of the vapor. The percolator 26 utilizes no moving part, provides a constant and abundant flow of boiling fluid at a well defined temperature, assuming a well defined barometric pressure, such that the blackened inner surface 14 of the black body cavity provides a standard or reference source of infrared radiation of a well defined temperature.

Referring now to FIG. 2, there is shown a further embodiment of the present invention comprising a hollow black body 10, provided with a viewing aperture 18, the black body 10 being disposed in a heat insulating non-emissive enclosure 22. The black body 10 is placed within a reservoir 28 containing a chemically pure liquid fluid 39 to an appropriate level as shown at 40. The liquid fluid 39 is introduced into a boiler defined by a portion 46 of a conduit 48 in communication with the bottom of reservoir 28, such portion 48 of the conduit 48 being surrounded by a heating coil 30, or the like. The mixture of boiling liquid and vapor is elevated through portion 34 of the conduit 48 to outlets 38 disposed proximate the outer surface of the hollow black body 10, such that the outer surface of the black body is at all times, while the apparatus is functioning, sprayed with a mixture of boiling liquid and vapors at a predetermined temperature, as previously explained. The vapors of the liquid are led by a conduit 50 to a condenser 42 which, in the example shown, consists of a straight pipe provided with a plurality of cooling fins 52. The condenser may be shielded by an appropriate reflective shield, now shown. The vapors condensed in the condenser 42 are returned to the reservoir 28 by means of a return conduit 54.

The operation of the example of standard or reference source of infrared radiation of FIG. 2 operates in the same manner and according to the same principles as previously explained with respect to the embodiment of FIG. 1.

If so desired, a thermal sensing device may be incorporated in standard or reference sources of infrared radiation according to the present invention. Such thermal sensing device is shown in FIG. 2 as consisting of a pair of thermo-couples or thermistors 54 and 56, one of which, thermo-couple or thermistor 56, is disposed proximate one of the outlets 38 so as to be heated to a temperature corresponding to the boiling temperature of the fluid. The other thermo-couple or thermistor 54 is disposed in the return portion of the condenser 42 such that its temperature is the condensing temperature of the fluid vapors. The two thermo-couples or thermistors 54 and 56 are connected, for example, through an amplifier 58 to a visual or audible indicator 60. The amplifier 58 may be any conventional sensitive differential amplifier or it may be a bridge arrangement incorporating the thermo-couples or thermistors 54 and 56 such that any unbalance of the bridge due to a difference of temperature between the thermo-couples or thermistors is shown by indicator 60. In this manner, a visual or audible indication is provided in the event that there is such a difference of temperature between the two thermo-couples or thermistors indicating a malfunction of the apparatus due to contamination of the fluid causing a difference between its boiling temperature and its condensing temperature. The liquid fluid may then be removed from the reservoir for the purpose of being purified or for replacement with a chemically pure fluid.

Alternately, the indicator 60 acts as a warning device in the event that the vapors of the fluid become superheated as a result of too great an input power to the heater coil 30.

Having thus described the invention, modifications and applications whereof will be obvious to those skilled in the art, what is sought to be protected by United States Letters Patent is as follows:

1. A standard or reference source of infrared radiation comprising in combination a hollow black body provided with a viewing aperture, an enclosure of heat-insulating material surrounding said black body and having an aperture aligned with said aperture of the black body, and means in said enclosure for continuously spraying the outer surface of said black body with a mixture of boiling liquid and vapors of a chemically stable fluid having a predetermined boiling temperature, said last mentioned means comprising a percolator including a boiler for said fluid, a heating element disposed in said boiler for heating said fluid to its boiling point, and a conduit for elevating said fluid from said boiler to at least one outlet disposed proximate the outer surface of said black body.

2. The combination of claim 1 wherein said black body is spherical.

3. The combination of claim 1 further comprising condenser means for condensing vapors of said fluid.

4. The combination of claim 3 further comprising indicating means for giving an indication of a difference between the temperature of said mixture of liquid and vapors and the temperature of condensation of said vapors.

5. The combination of claim 3 further comprising a heat shield for said condenser means.

6. The combination of claim 1 further comprising a heat reflecting coating on the interior of said enclosure.

References Cited

UNITED STATES PATENTS

| | | | |
|---|---|---|---|
| 2,952,762 | 9/1960 | Williams et al. | 250—85 |
| 3,348,408 | 10/1967 | Engborg | 250—84 X |
| 3,410,559 | 11/1968 | Miller et al. | 250—85 X |

WILLIAM F. LINDQUIST, Primary Examiner

U.S. Cl. X.R.

250—88